United States Patent
King (10) Patent No.: US 10,533,457 B2
(45) Date of Patent: Jan. 14, 2020

(54) EXHAUST LINER CABLE FASTENER

(71) Applicant: United Technologies Corporation, Farmington, CT (US)

(72) Inventor: Christopher King, Bristol, CT (US)

(73) Assignee: United Technologies Corporation, Farmington, CT (US)

(*) Notice: Subject to any disclaimer, the term of this patent is extended or adjusted under 35 U.S.C. 154(b) by 198 days.

(21) Appl. No.: 15/592,677

(22) Filed: May 11, 2017

(65) Prior Publication Data
US 2018/0328227 A1    Nov. 15, 2018

(51) Int. Cl.
| F01D 25/28 | (2006.01) |
| F01D 25/24 | (2006.01) |
| F01D 25/30 | (2006.01) |
| F02K 1/80 | (2006.01) |

(52) U.S. Cl.
CPC ........... *F01D 25/28* (2013.01); *F01D 25/243* (2013.01); *F01D 25/30* (2013.01); *F05D 2260/30* (2013.01)

(58) Field of Classification Search
None
See application file for complete search history.

(56) References Cited

U.S. PATENT DOCUMENTS

| 3,826,088 A | 7/1974 | Nash et al. |
| 7,581,399 B2 | 9/2009 | Farah et al. |
| 7,861,535 B2 | 1/2011 | Figueroa et al. |
| 9,157,394 B2 | 10/2015 | Peters |
| 9,316,174 B2 | 4/2016 | Kramer et al. |
| 2009/0293498 A1* | 12/2009 | Petty ............ F01D 25/28 60/796 |
| 2013/0319007 A1 | 12/2013 | Peters |
| 2014/0047848 A1* | 2/2014 | Peters ............ F02K 1/04 60/796 |
| 2014/0048166 A1 | 2/2014 | Kramer et al. |
| 2014/0069106 A1* | 3/2014 | Preston, III ...... F02K 1/822 60/796 |
| 2014/0157782 A1 | 6/2014 | Kramer |
| 2014/0227093 A1 | 8/2014 | Barry |
| 2014/0230246 A1* | 8/2014 | McMahon ........ F01D 25/28 29/889.2 |
| 2015/0071704 A1* | 3/2015 | Senofonte ........ F02K 1/80 403/299 |
| 2016/0003192 A1* | 1/2016 | Roberge ........ F01D 25/08 60/782 |

OTHER PUBLICATIONS

EP search report for EP18160521.3 dated Sep. 5, 2018.

* cited by examiner

*Primary Examiner* — William H Rodriguez
*Assistant Examiner* — Rodolphe Andre Chabreyrie
(74) *Attorney, Agent, or Firm* — O'Shea Getz P.C.

(57) ABSTRACT

A hanger for mounting an exhaust liner to an exhaust duct is provided. The hanger includes at least one cable, a cable flange, and a J-shaped flange. The at least one cable extends lengthwise between a first end and a second end. The cable flange has at least one cable aperture configured to receive a portion of the cable. The J-shaped liner flange is configured for attachment to the exhaust liner. The liner flange and cable flange are configured to mate with one another to prevent substantial relative motion between the cable flange and the liner flange in a first direction and in a second direction. The first and second directions are substantially orthogonal to one another.

20 Claims, 5 Drawing Sheets

EXHAUST LINER CABLE FASTENER

This invention was made with government support under Contract No. FA8626-15-D-0015-3502 awarded by the United States Air Force. The government may have certain rights in the invention.

BACKGROUND OF THE INVENTION

1. Technical Field

The invention relates generally to gas turbine engines and more particularly to exhaust duct liner attachment systems and methods.

2. Background Information

In gas turbine engines, it is necessary to protect exhaust ducts with an insulating shield in order to prevent heated core gases from damaging the exhaust ducts. Exhaust gases, however, may reach much higher temperatures, particularly if thrust augmentation is utilized. It is, therefore, necessary to line exhaust ducts with a material that is capable of withstanding the peak temperatures of the core gases and that prevents the exhaust duct from reaching its temperature limitations. In order to alleviate some of the heat from the exhaust gases imparted to the liner, cooling air is passed between the exhaust duct and liner and is bled through thousands of small cooling holes in the liner. For example, bypass air is routed between the duct and liner in turbofan engines. Thus, the exhaust duct and liner are subjected to different pressure and temperature gradients, which results in differing deflections and expansions of each body.

In order to maintain the desired temperature and pressure profile along the exhaust duct and liner, it is desirable to maintain proper spacing between the exhaust duct and liner. The differing pressures, temperatures and functional requirements of the exhaust duct, however, produce three-dimensional forces between the duct and liner, which tend to shift the liner out of alignment. Various designs have been put forth to maintain proper alignment, such as described in U.S. Pat. Nos. 7,581,399 and 7,861,535 which are assigned to United Technologies Corporation. Some of these designs, however, require careful insertion of support members through holes in either the exhaust duct or liner. There is, therefore, a need for an easy to install exhaust duct liner suspension system that maintains proper spacing between an exhaust duct and a duct liner, while also permitting the liner to shift in other directions to accommodate, among other things, thermal growth.

SUMMARY

According to one aspect of the present disclosure, a hanger for mounting an exhaust liner to an exhaust duct is provided. The hanger includes at least one cable, a cable flange, and a J-shaped flange. The at least one cable extends lengthwise between a first end and a second end. The cable flange has at least one cable aperture configured to receive a portion of the cable. The J-shaped liner flange is configured for attachment to the exhaust liner. The liner flange and cable flange are configured to mate with one another to prevent substantial relative motion between the cable flange and the liner flange in a first direction and in a second direction. The first and second directions are substantially orthogonal to one another.

In at least one embodiment of the any aspect of the present disclosure, the cable flange may be T-shaped. In at least one embodiment of the any aspect of the present disclosure, the cable flange may be U-shaped.

According to another aspect of the present disclosure, a hanger for mounting an exhaust liner to an exhaust duct is provided. The hanger includes at least one cable, a cable flange, and a liner flange. The at least one cable extends lengthwise between a first end and a second end. The cable flange has a plurality of first tabs extending outwardly from a primary member, and at least one cable aperture disposed in the primary member configured to receive a portion of the cable. The first end of the at least one cable is configured for attachment to the exhaust duct, and the second end of the at least one cable is configured for engagement with the cable flange. The liner flange has at least one outwardly extending second tab and a leg configured for attachment to the exhaust liner. The liner flange and cable flange are configured to mate with one another such that the first tabs prevent substantial relative motion between the cable flange and the liner flange in a first direction, and the second tab prevents substantial relative motion between the cable flange and the liner flange in a second direction. The first and second directions are orthogonal to one another.

According to at least one embodiment of any aspect of the present disclosure, the cable flange may include a wing element that extends outwardly from the primary element. The wing element has a distal end spaced apart from the primary element, and a wing tab extending outwardly from the wing element adjacent the distal end of the wing element.

According to any embodiment or aspect of the present disclosure, the plurality of first tabs and the wing tab may extend in similar directions.

According to any embodiment or aspect of the present disclosure, the plurality of first tabs and the wing tab may extend in a direction substantially perpendicular to the first and second directions.

According to any embodiment or aspect of the present disclosure, the plurality of first tabs may include a first primary tab and a second primary tab, and the cable aperture may extend through the cable flange at a position disposed between the first primary tab and the second primary tab.

According to any embodiment or aspect of the present disclosure, the cable may include a boss adjacent the second end of the cable, and the cable flange may include a first surface and a second surface, which second surface is opposite the first surface. The cable flange may include a cavity disposed in the second surface, the cavity configured to mate with the boss of the cable. The cable aperture extends between the first surface of the cable flange and the cavity.

According to any embodiment or aspect of the present disclosure, the cable flange may include a first surface and a second surface, which second surface is opposite the first surface, and the cable aperture may extend between the first surface of the cable flange and the second surface of the cable flange.

According to any embodiment or aspect of the present disclosure, the liner flange may include a main member, a first projection element, and a second projection element. The at least one leg extends outwardly from the main member. The first and second projection elements extend outwardly from the main member. The at least one outwardly extending second tab includes a first projection tab extending outwardly from the first projection member and a second projection tab extending outwardly from the second projection member.

According to any embodiment or aspect of the present disclosure, the at least one leg may include a first leg extending outwardly from the main member and a second leg extending outwardly from the main member.

According to any embodiment or aspect of the present disclosure, the liner flange may have a "J" shaped geometry.

According to any embodiment or aspect of the present disclosure, the primary member may extend between a first end and a second end, and the plurality of first tabs includes a first primary tab disposed at the first end, and a second primary tab disposed at the second end.

According to any embodiment or aspect of the present disclosure, the at least one cable aperture may include a first cable aperture extending through the first primary tab, and a second cable aperture extending through the second primary tab.

According to any embodiment or aspect of the present disclosure, the at least one cable may include a first cable and a second cable, and each of the first cable and the second cable includes a boss attached to the respective cable adjacent the second end, and the cable flange may include a first cavity configured to mate with the boss of the first cable, and a second cavity configured to mate with the boss of the second cable.

According to any embodiment or aspect of the present disclosure, the liner flange may include a projection element and a leg. The projection element has a distal end. The leg has a distal end, and may extend outwardly from the projection element in a direction substantially perpendicular to the projection element. The at least one outwardly extending second tab may extend outwardly from the projection member.

According to another aspect of the present disclosure, a gas turbine engine is provided that includes a fan section, a compressor section, a turbine section, at least one rotor shaft connecting the compressor and turbine section, a circumferential exhaust duct disposed downstream of the turbine section, a circumferential exhaust liner disposed radially inside of the exhaust duct, thereby defining an annular passage between the exhaust duct and the exhaust liner, and a plurality of hangers configured to collectively support the exhaust liner. Each of the hangers includes at least one cable, a cable flange and a J-shaped flange. The at least one cable extends lengthwise between a first end configured for retention by the exhaust duct, and a second end. The cable flange has at least one cable aperture configured to receive a portion of the cable. The second end of the cable is configured for engagement with the cable flange. The J-shaped liner flange is configured for attachment to the exhaust liner. The liner flange and cable flange are configured to mate with one another to prevent substantial relative motion between the cable flange and the liner flange in a first direction and in a second direction, wherein the first and second directions are substantially orthogonal to one another.

According to any embodiment or aspect of the present disclosure, the cable flange may be T-shaped. According to any embodiment or aspect of the present disclosure, the cable flange may be U-shaped.

DETAILED DESCRIPTION

Figure 1:
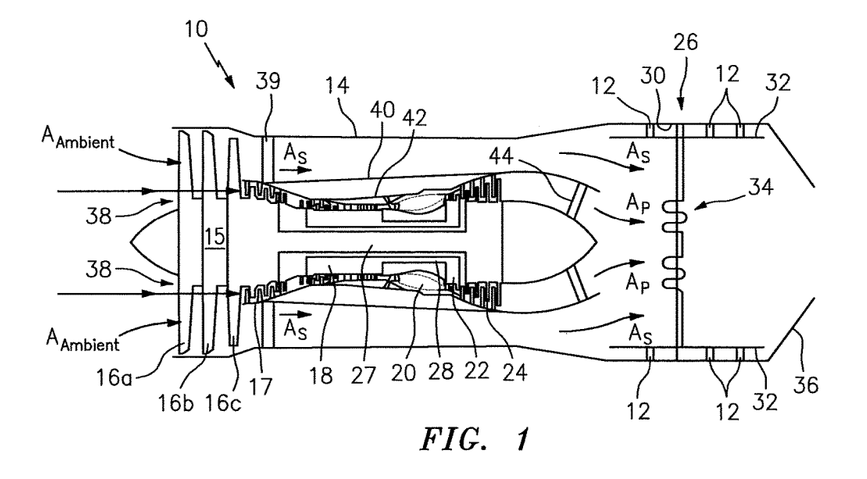
FIG. 1 is a schematic diagram of a dual-spool, low-bypass ratio turbofan engine having an exhaust liner supported within an exhaust duct using hangers according to the present disclosure.

FIG. 1 shows a schematic diagram of dual-spool, low-bypass ratio turbofan engine 10, in which hangers 12 of the present invention can be used. Although, in other embodiments, the present invention is applicable to other types of gas turbine engines such as high-bypass ratio turbofans including turbofans using fan drive gear systems. Turbofan engine 10 also includes fan duct 14, drive fan 15 (including stages 16a-16c), low pressure compressor 17, high pressure compressor 18, combustor 20, high pressure turbine 22, low pressure turbine 24 and exhaust system 26. Drive fan 15 and low pressure compressor 17 are driven by low pressure turbine 24 with shaft 27. High pressure compressor 18 is driven by high pressure turbine 22 with shaft 28. High pressure compressor 18, combustor 20, high pressure turbine 22 and shaft 28 comprise the core of turbofan engine 10, which produces the high energy air stream that is ultimately used to drive low pressure turbine 24 and provide high pressure flow to produce thrust via both primary air $A_P$ and secondary air $A_S$. Exhaust system 26 includes exhaust duct 30, exhaust liner 32, augmentation system 34 and exhaust nozzle 36. Exhaust system 26 also includes hangers 12 such as the hangers 12 of the present disclosure. FIG. 1 diagrammatically shows hangers 12 disposed in multiple circumferential arrays to suspend the exhaust liner 32 within exhaust duct 30. The hanger 12 arrays in FIG. 1 are shown to illustrate the relative environment and are not intended to be limiting in any manner; e.g., FIG. 1 shows three, axial sequential arrays of hangers 12, and an exhaust liner 32 may be supported by many more arrays wherein the total number of hangers numbers in the hundreds.

Ambient air ($A_{Ambient}$) enters engine 10 at inlet 38 through drive fan 15. Drive fan 15 is rotated by low pressure turbine 24 to accelerate ambient air $A_{Ambient}$ thereby producing a major portion of the thrust output of engine 10. Accelerated ambient air $A_{Ambient}$ is divided into two streams of air: primary air $A_P$ and secondary air $A_S$. Secondary air $A_S$, also known as bypass air, passes through fan exit guide vanes 39 and between fan duct 14 and aft duct 40 where it passes on to exhaust system 26. Thus, a principal function of secondary air $A_S$ is the production of thrust from drive fan 15. Secondary air $A_S$ also serves to cool exhaust liner 32 from primary air $A_P$. Primary air $A_P$, also known as hot air, is a stream of air that is directed first into low pressure compressor 17 and then into high pressure compressor 18 within engine case 42, where it is increased in pressure relative to ambient. Pressurized primary air $A_P$ is then passed into combustor 20 where it is mixed with a fuel supply and ignited to produce high energy gases, as is known in the art. The high energy gasses are used to turn high pressure turbine 22 and low pressure turbine 24. The high pressure turbine 22 drives the high pressure compressor 18 with shaft 28, while the low pressure turbine 24 drives the low pressure compressor 17 and drive fan 15 with shaft 27. Primary air $A_P$ passes into the exhaust system 26 through exit guide vanes 44.

Mixed combusted primary air $A_P$ and bypassed secondary air $A_S$ are passed into exhaust duct 30 of exhaust system 26. As is known in the art, a secondary combustion process can be carried out using the augmentation system 34 within the volume defined by the exhaust liner 32. The augmentation process elevates the speed and temperature of the mixed exhaust gas to further produce thrust via the exhaust nozzle 36. The exhaust liner 32, which is suspended from the exhaust duct 30 with hangers 12, prevents overheating of the exhaust duct 30 from the secondary combustion process. The hangers 12 allow the exhaust liner 32 to positionally shift relative to the exhaust duct 30 to accommodate different thermal expansion rates between the exhaust liner 32 and the exhaust duct 30, while accommodating different temperature gradients throughout exhaust system 26. The hangers 12 permit radial, circumferential, and axial displacement of exhaust liner 32 within the exhaust duct 30 without inducing additional stress on the exhaust liner 32. The hangers 12 also facilitate expedient assembly of the exhaust liner 32 within the exhaust duct 30.

Figure 2:
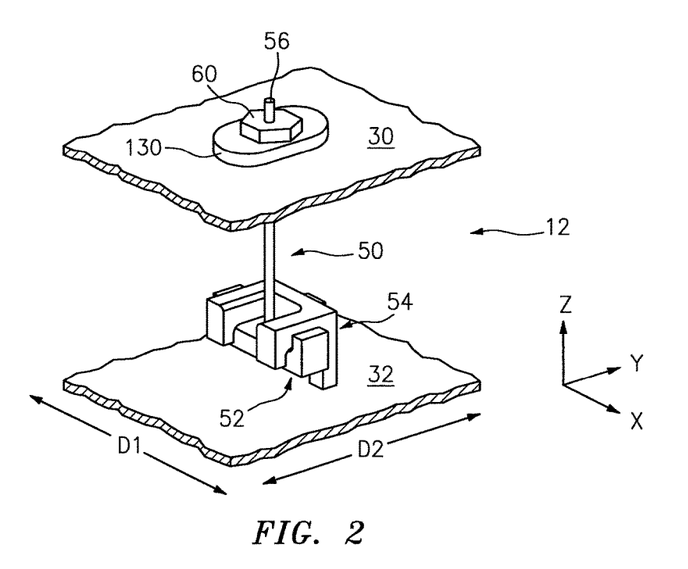
FIG. 2 is a diagrammatic perspective view of a present hanger embodiment.
Figure 8:
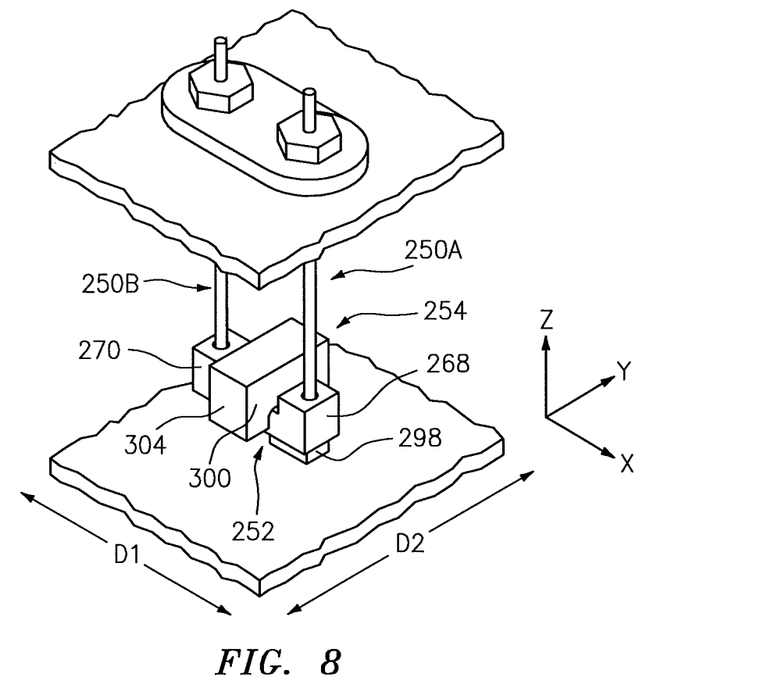
FIG. 8 is a diagrammatic perspective view of a present hanger embodiment.

A hanger 12 according to the present disclosure includes at least one cable 50, a cable flange 52 and a liner flange 54. The cable flange 52 and the liner flange 54 mate with one another to enhance retention with one another. Exemplary hanger 12 embodiments are shown in FIGS. 2 and 8.

Figure 3:
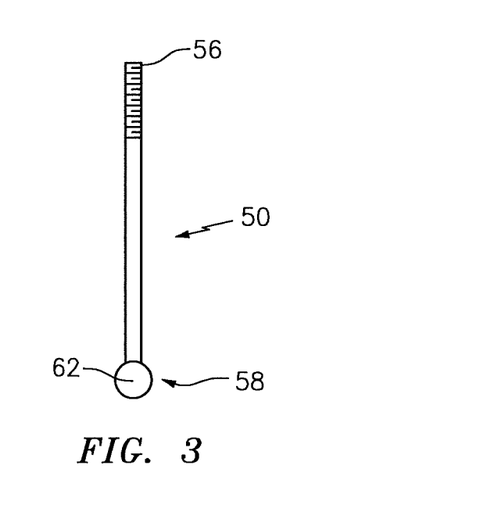
FIG. 3 is a diagrammatic planar view of a cable.
Figure 7:
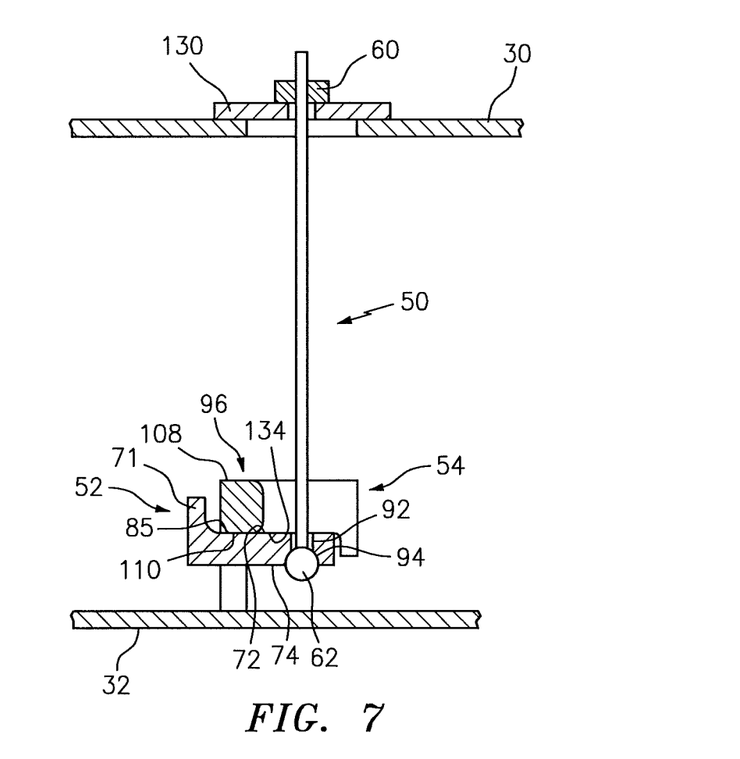
FIG. 7 is a diagrammatic sectional side view of the hanger embodiment shown in FIG. 2.

The cable 50 has a body that extends lengthwise between a first end 56 and an opposing second end 58. The first end 56 is configured to permit the cable 50 to be retained relative to the exhaust duct. For example, in the embodiment shown in FIGS. 2, 3, and 7, the first end 56 includes a threaded portion. As will be explained below, a nut 60 may be threaded onto the threaded portion to facilitate retention of the cable 50 relative to the exhaust duct. The cable 50 is not limited to this particular first end 56 configuration, however; e.g., a retention mechanism other than a threaded portion may be used alternatively. A boss 62 is attached to the cable 50 at, or proximate to, the second end 58. The boss 62 is configured for engagement with the cable flange 52. As shown in FIG. 3, in some embodiments the boss 62 may have a substantially spherical configuration that mates with a surface (e.g., cavity 94) of the cable flange 52. The boss 62 is not limited to this particular geometric configuration, however. The cable 50 may be rigid or may be flexible, and is configured to support a load under tension between the cable ends 56, 58.

As will be described below, the cable flange 52 and the liner flange 54 are configured to mate with another to enhance retention with one another. The specific manner in which the cable flange 52 and the liner flange 54 mate will vary depending on the specific geometries of the respective flanges. To facilitate the present description, orthogonal axes X-Y-Z are shown in certain of the FIGURES.

Figure 4:
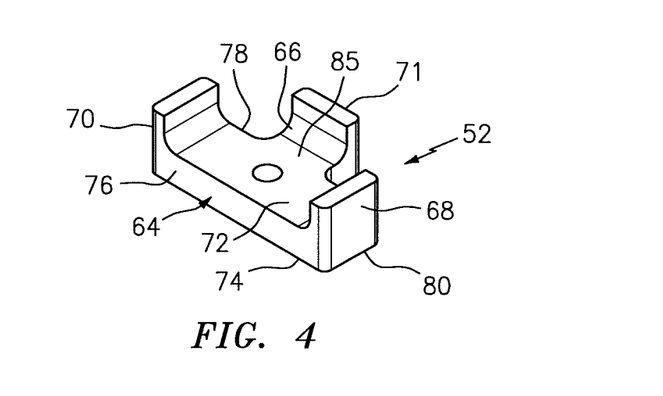
FIG. 4 is a diagrammatic perspective view of a cable flange embodiment.
Figure 5:
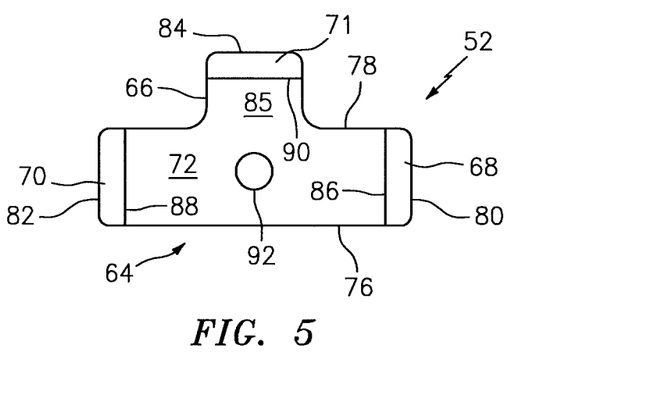
FIG. 5 is a planar top view of the cable flange embodiment shown in FIG. 4.

In a first hanger embodiment shown in FIGS. 2-7, for example, the cable flange 52 (e.g., see FIG. 4) includes a primary member 64, a wing element 66, a first primary tab 68, a second primary tab 70, and a wing tab 71. The primary member 64 includes a bracket surface 72, a bottom surface 74, a first side surface 76, a second side surface 80, a first end 80, and a second end 82. The bracket surface 72 and the bottom surface 74 are disposed on opposite sides of the primary member 64. The first side surface 76 and the second side surface 78 are disposed on opposite sides of the primary member 64 and extend between the bracket surface 72 and the bottom surface 74. The first end 80 and second end 82 are disposed on opposite ends of the primary member 64. The wing element 66 extends outwardly from the second side surface 78 of the primary member 64 to a distal end 84 and has an upper surface 85. As can be seen in planar view of FIG. 5, the orientation of the wing element 66 and the primary member 64 give this embodiment of the cable flange 52 a "T" geometry. The first primary tab 68 extends outwardly from the bracket surface 72 adjacent the first end 80, the second primary tab 70 extends outwardly from the bracket surface 72 adjacent the second end 82, and the wing tab 71 extends outwardly from the wing element 66 adjacent the distal end 84. As can be seen in FIGS. 4 and 5, the first primary tab 68, second primary tab 70, and the wing tab 71 extend in similar directions. The first primary tab 68 has an interior surface 86, the second primary tab 70 has an interior surface 88, and the wing tab 71 has an interior surface 90. The interior surfaces 86, 88 of the first and second primary tabs 68, 70 face one another. In the embodiment shown in FIGS. 4 and 5, the upper surface 85 of the wing element 66 is substantially coplanar with the bracket surface 72. The primary member 64 includes a cable aperture 92 that extends through the primary member 64 and is sized to receive a portion of the cable 50. The cable flange 52 may include a cavity 94 (see FIG. 7) disposed in the bottom surface 74 configured to mate with the cable boss 62. For example, in the embodiment shown in FIG. 7 the cable 50 includes a substantially spherical boss 62 and the primary member cavity 94 has a shape that mates with the spherical boss 62. In this embodiment, the cable aperture 92 extends entirely between the bracket surface 72 and the primary member cavity 94. In alternative embodiments, the cable flange 52 does not include a cavity, the cable aperture 92 extends between the bracket surface 72 and the bottom surface 74, and the cable boss 62 is configured to engage a portion of the bottom surface 74.

Figure 6:
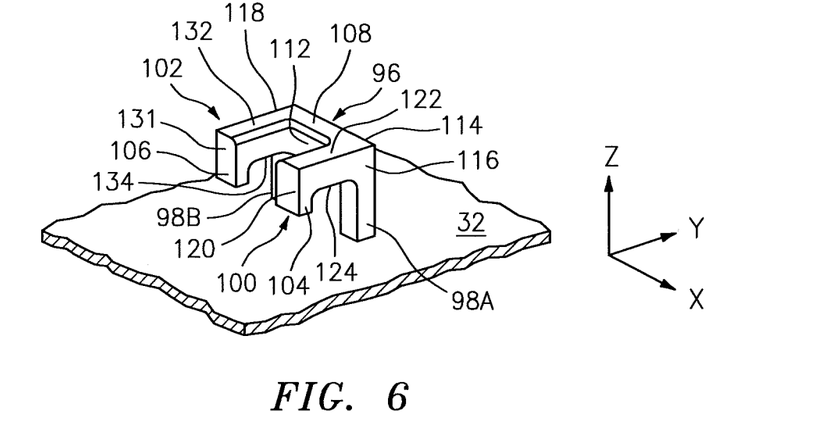
FIG. 6 is a diagrammatic perspective view of a liner flange embodiment attached to an exhaust liner panel.

In the first hanger embodiment shown in FIGS. 2-7, the liner flange 54 includes a main member 96, at least one leg (the embodiment shown in FIG. 6 includes a first leg 98A and a second leg 98B), a first projection element 100, a second projection element 102, a first projection tab 104, and a second projection tab 106. The main member 96 includes an exposed surface 108, a panel-side surface 110, a first side surface 112, a second side surface 114, a first end 116, and a second end 118. The exposed surface 108 and the panel-side surface 110 are disposed on opposite sides of the main member 96. The first side surface 112 and the second side surface 114 are disposed on opposite sides of the main member 96 and extend between the exposed surface 108 and the panel-side surface 110. The first end 116 and second end 118 are disposed on opposite ends of the main member 96. The first projection element 100 extends outwardly from the main member first side surface 112 adjacent the main member first end 116 to a distal end 120. The first projection element 100 includes an exposed surface 122 and a panel-side surface 124. The second projection element 102 extends outwardly from main member first side surface 112 adjacent the main member second end 118 to a distal end 130. The second projection element 102 includes an exposed surface 132 and a panel-side surface 134. In the embodiment shown in FIG. 6, both the first and second projection elements 100, 102 extend outwardly in a direction that is substantially perpendicular to the main member 96. The present disclosure is not, however, limited to this embodiment. For example, the first and second projection elements 100, 102 may alternatively be configured to receive a circular shaped cable flange primary member 64. The first and second projection elements 100, 102 are also spaced apart from one another, thereby creating a void there between large enough for a portion of the cable 50 to extend through. The first leg 98A extends outwardly from the main member panel-side surface 110 adjacent the main member first end 116 to a distal end. The second leg 98B extends outwardly from the main member panel-side surface 110 adjacent the main member second end 118 to a distal end. The distal ends of the first and second legs 98A, 98B are attached to a panel of the exhaust liner 32. Acceptable methods of attachment include, but are not limited to, metallurgical attachment (e.g., welding, brazing, soldering, etc.), mechanical fastener, adhesive bonding, etc. The first projection tab 104 extends outwardly from the first projection element 100 adjacent the distal end 120, and the second projection tab 106 extends outwardly from the second projection element 102 adjacent the distal end 130. As can be seen in FIG. 6, the first projection tab 104 and the second projection tab 106 extend in a similar direction. As can be seen in FIG. 6, the orientation of the legs 98A, 98B, the main member 96, the projection elements 100, 102, and the projection tabs 104, 106 give this embodiment of the liner flange 54 a "J" geometry.

During assembly of the first hanger embodiment, the threaded portion of the cable 50 is drawn through the cable aperture 92 within the cable flange 52 until the cable boss 62 is engaged with the cable flange 52 (e.g., the cable boss 62 is engaged with the mating cavity 94 disposed in the bottom surface 74 of the cable flange 52). The cable flange 52 is engaged with the liner flange 54 such that the primary member bracket surface 72 of the cable flange 52 is in contact with the panel-side surfaces 124, 134 of the liner flange projection elements 100, 102, and the upper surface 85 of the cable flange wing element 66 is in contact with the panel-side surface 110 of the liner flange main member 96. When the mating cable flange 52 and liner flange 54 are engaged with one another, the tabs 104, 106 of the liner flange 54 and the tabs 68, 70, 71 of the cable flange 52 (all shown extending substantially in the "Z" direction) are disposed to help retain the aforesaid flanges together. Specifically, the first and second primary tabs 68, 70 are disposed so that they limit movement of the cable flange 52 in the direction "D1" relative to the liner flange 54. In FIG. 2, direction "D1" coincides with the orthogonal axis "X". The wing tab 71 is disposed outside of the main member 96 of the liner flange 54 and the projection tabs 104, 106 are disposed outside of the first side surface 76 of the cable flange. Collectively, the wing tab 71 and the projection tabs 104, 106 limit the movement of the cable flange 52 in the direction "D2" relative to the liner flange 54. In FIG. 2, direction "D2" coincides with the orthogonal axis "Y". The relative mating shapes of the liner and cable flanges 52, 54 greatly facilitate assembly and maintain relative engagement with one another.

In a second hanger embodiment shown in FIGS. 8-11, for example, the hanger 12 includes a cable flange 252, a liner flange 254, a first cable 250A, and a second cable 250B. The first and second cables 250A, 250B may have a form as described above.

Figure 9:
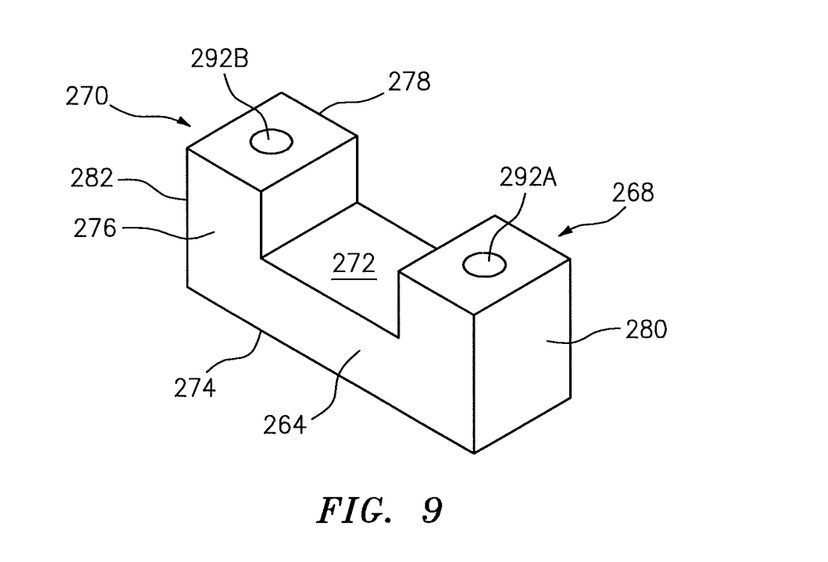
FIG. 9 is a diagrammatic perspective view of a cable flange embodiment.
Figure 10:
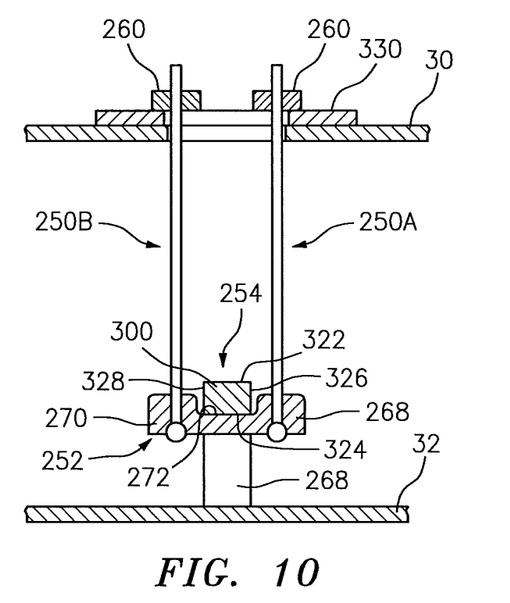
FIG. 10 is a diagrammatic sectional front view of the hanger embodiment shown in FIG. 8.

The cable flange 252 (e.g., see FIG. 9) includes a primary member 264, a first primary tab 268, and a second primary tab 270. The primary member 264 includes a bracket surface 272, a bottom surface 274, a first side surface 276, a second side surface 278, a first end 280, and a second end 282. The bracket surface 272 and the bottom surface 274 are disposed on opposite sides of the primary member 264. The first side surface 276 and the second side surface 278 are disposed on opposite sides of the primary member 264 and extend between the bracket surface 272 and the bottom surface 274. The first end 280 and second end 282 are disposed on opposite ends of the primary member 264. The first primary tab 268 extends outwardly from the bracket surface 272 adjacent the first end 280, and the second primary tab 270 extends outwardly from the bracket surface 272 adjacent the second end 282. As can be seen in FIG. 9, the first primary tab 268 and the second primary tab 270 extend in similar directions. A first cable aperture 292A extends through the first primary tab 268 and a second cable aperture 292B extends through the second primary tab 270, and each cable aperture 292A, 292B is sized to receive a portion of a cable 250A, 250B. The cable flange 252 may include a cavity (described above) disposed in the bottom surface 274 associated with each cable aperture 292A, 292B configured to mate with the cable boss as described above. In alternative embodiments, the cable flange 252 may not include cavities, in which case the cable boss may be configured to engage a portion of the bottom surface as described above. As can be seen in FIG. 9, the orientation of the primary member 264, the first primary tab 268, and the second primary tab 270 give this embodiment of the cable flange 252 a "U" shaped geometry.

Figure 11:
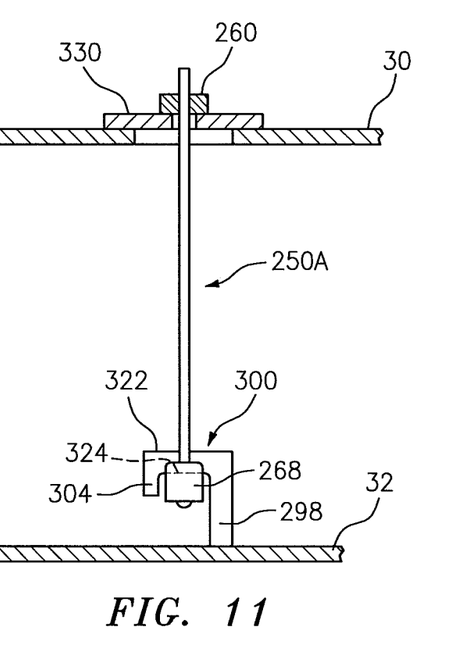
FIG. 11 is a diagrammatic sectional side view of the hanger embodiment shown in FIG. 8.

The liner flange 254 (e.g., see FIGS. 8, 10, and 11) includes a leg 298, a projection element 300, and a projection tab 304. The leg 298 and the projection element 300 extend outwardly from one another and are substantially perpendicular to one another. The projection element 300 includes an exposed surface 322, a panel-side surface 324, a first side surface 326, and a second side surface 328. The first and second side surfaces 326, 328 extend between the exposed and panel-side surfaces 322, 324. A distal end of the 298 leg is configured for attachment to the exhaust liner 32. Acceptable methods of attachment include, but are not limited to, metallurgical attachment (e.g., welding, brazing, soldering, etc.), mechanical fastener, adhesive bonding, etc. The projection tab 304 extends outwardly from a distal end of the projection element 300. As can be seen in FIG. 11, the orientation of the leg 298, the projection element 300, and the projection tab 304 gives this embodiment of the liner flange 254 a "J" shaped geometry.

During assembly of the second hanger embodiment, the threaded portion of the first and second cables 250A, 250B are drawn through the respective cable aperture 292A, 292B until the respective cable boss is engaged with the cable flange 254. The cable flange 252 is engaged with the liner flange 254 such that the primary member bracket surface 272 of the cable flange 252 is in contact with the panel-side surface 324 of the liner flange projection element 300. When the mating cable flange 252 and liner flange 254 are engaged with one another, the tabs 304, 268, 270 of the liner flange 254 and the cable flange 252 (e.g., extending substantially along the "Z" orthogonal axis) are disposed to help retain the aforesaid flanges together. Specifically, the first and second primary tabs 268, 270 limit movement of the cable flange 252 in the direction "D1" relative to the liner flange 254. In FIG. 8, direction "D1" coincides with the orthogonal axis "X". The projection tab 304 and the liner flange leg 298 limit the movement of the cable flange 252 in the direction "D2" relative to the liner flange 254. In FIG. 8, direction "D2"

coincides with the orthogonal axis "Y". The relative mating shapes of the liner and cable flanges greatly facilitate assembly and maintain relative engagement with one another.

The above described first and second embodiments of the present hanger 12 represent examples of a mating hanger according to the present disclosure. The present disclosure is not, however, limited to these two embodiments. For example, the second embodiment liner flange may, in an alternative embodiment, include a projection element extending between a first leg and a second leg (e.g., the liner flange is "U" shaped). Each leg has a distal end that is attachable to the exhaust liner 32.

In any of the embodiments of the present disclosure, intersections between surfaces may be radiused or have a fillet extending there between to mitigate any stress concentration that may otherwise be present in the absence of such radius or fillet; e.g., the radius or fillet eliminates sharp changes between surfaces that act as stress risers.

A plurality of the hangers 12 according to the present disclosure can be used to secure a circumferentially extending exhaust liner 32 radially inside of a circumferentially extending exhaust duct 30. A number of the hangers 12 extend from the exhaust duct 30 to the exhaust liner 32 at circumferential positions. Hence, the hangers 12 extend through an annular region disposed between the exhaust duct 30 and the exhaust liner 32, which annular region acts as an annular passage for secondary air $A_S$.

As indicated above, the first end of the cable 50, 250A, 250B of each hanger is configured to facilitate retention of the cable 50 relative to an exhaust duct panel. The first end of the cable 50, 250A, 250B is threaded and a washer 130, 330 (e.g., an anti-rotation washer) and a threaded nut 60, 260 may be used to retain the cable 50, 250A, 250B (and therefore the hanger 12) relative to the exhaust duct 30. Specifically, in assembled form the threaded end of the cable 50, 250A, 250B extends through apertures in the exhaust duct 30 and through the washer 130, 330. The nut 60, 260 is in threaded engagement with the cable threaded portion, drawing the hanger 12 in tension to secure the exhaust liner 32. In some embodiments, a seal (e.g., an O-ring, a gasket, etc.) may be used to seal the area where the cable 50 extends through the exhaust duct panel.

During operation of turbofan engine 10 (FIG. 1), various temperature gradients within exhaust system 26 (FIG. 1) produce different thermal expansion and contraction within the exhaust duct 30 and the exhaust liner 32. The exhaust liner 32 may as a result be subject to local distortions and displacements. The hangers 12 of the present disclosure permit some degree of relative movement between the exhaust 30 and the exhaust liner 32; e.g., relative movement resulting from thermal gradients. The hangers 12 distributed circumferentially around liner 32 allow exhaust duct 30 help maintain the shape of exhaust liner 32 despite the thermal gradients.

A hanger 12 according to the present disclosure greatly facilitates installation of the exhaust liner 32. In addition, the configurations of the mating cable and liner flanges 52, 54, 252, 254 greatly enhance retention with one another. The mating flange configurations permit some degree of relative movement between the flanges with minimal stresses developing within either flange, or in the exhaust liner 32.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A hanger for mounting an exhaust liner to an exhaust duct, the hanger comprising:
   at least one cable extending lengthwise between a first end and a second end;
   a cable flange having a plurality of first tabs extending outwardly from a primary member, and at least one cable aperture disposed in the primary member and configured to receive a portion of the at least one cable;
   wherein the first end of the at least one cable is configured for attachment to the exhaust duct, and the second end of the at least one cable is configured for engagement with the cable flange; and
   a liner flange having at least one outwardly extending second tab and at least one leg configured for attachment to the exhaust liner;
   wherein the liner flange and cable flange are configured to mate with one another such that the plurality of first tabs prevent substantial relative motion between the cable flange and the liner flange in a first direction, and the second tab prevents substantial relative motion between the cable flange and the liner flange in a second direction, wherein the first and second directions are orthogonal to one another; and
   wherein the cable flange includes a first surface and a second surface, which second surface is opposite the first surface, and wherein the at least one cable aperture extends between the first surface of the cable flange and the second surface of the cable flange.

2. The hanger of claim 1, wherein the cable flange includes a wing element that extends outwardly from the primary member, the wing element having a distal end spaced apart from the primary member, and a wing tab extending outwardly from the wing element adjacent the distal end of the wing element.

3. The hanger of claim 2, wherein the plurality of first tabs and the wing tab extend in similar directions.

4. The hanger of claim 3, wherein the plurality of first tabs and the wing tab extend in a direction substantially perpendicular to the first and second directions.

5. The hanger of claim 3, wherein the plurality of first tabs include a first primary tab and a second primary tab, and wherein the at least one cable aperture extends through the cable flange at a position disposed between the first primary tab and the second primary tab.

6. The hanger of claim 1, wherein the at least one cable includes a boss adjacent the second end of the at least one cable; and the cable flange includes a first surface and a second surface, which second surface is opposite the first surface, and the cable flange includes a cavity disposed in the second surface, the cavity configured to mate with the boss of the at least one cable; and wherein the at least one cable aperture extends between the first surface of the cable flange and the cavity.

7. The hanger of claim 1, wherein the liner flange comprises:
   a main member, wherein the at least one leg extends outwardly from the main member;

a first projection element and a second projection element, wherein the first and second projection elements extend outwardly from the main member; and the at least one outwardly extending second tab includes a first projection tab extending outwardly from the first projection member and a second projection tab extending outwardly from the second projection member.

8. The hanger of claim 7, wherein the at least one leg includes a first leg extending outwardly from the main member and a second leg extending outwardly from the main member.

9. The hanger of claim 1, wherein the liner flange has a "J" shaped geometry.

10. The hanger of claim 1, wherein the primary member extends between a first end and a second end, and the plurality of first tabs includes a first primary tab disposed at the first end, and a first secondary tab disposed at the second end.

11. The hanger of claim 1, wherein the liner flange comprises:
a projection element having a distal end; and
a leg of the at least one leg having a distal end, the leg extending outwardly from the projection element in a direction substantially perpendicular to the projection element; and
the at least one outwardly extending second tab extends outwardly from the projection member.

12. A gas turbine engine, comprising:
a compressor section;
a turbine section;
at least one rotor shaft connecting the compressor and turbine section;
a circumferential exhaust duct disposed downstream of the turbine section;
a circumferential exhaust liner disposed radially inside of the exhaust duct, thereby defining an annular passage between the exhaust duct and the exhaust liner; and
a plurality of hangers configured to collectively support the exhaust liner, wherein each of the hangers includes:
at least one cable extending lengthwise between a first end and a second end;
a cable flange having a plurality of first tabs extending outwardly from a primary member, and at least one cable aperture disposed in the primary member and configured to receive a portion of the at least one cable;
wherein the first end of the at least one cable is configured for attachment to the exhaust duct, and the second end of the at least one cable is configured for engagement with the cable flange; and
a liner flange having at least one outwardly extending second tab and at least one leg configured for attachment to the exhaust liner;
wherein the liner flange and cable flange are configured to mate with one another such that the plurality of first tabs prevent substantial relative motion between the cable flange and the liner flange in a first direction and the second tab prevents substantial relative motion between the cable flange and the liner flange in a second direction, wherein the first and second directions are substantially orthogonal to one another; and
wherein the cable flange includes a first surface and a second surface, which second surface is opposite the first surface, and wherein the at least one cable aperture extends between the first surface of the cable flange and the second surface of the cable flange.

13. The gas turbine engine of claim 12, wherein the cable flange is T-shaped.

14. A hanger for mounting an exhaust liner to an exhaust duct, the hanger comprising:
at least one cable extending lengthwise between a first end and a second end;
a cable flange having a plurality of first tabs extending outwardly from a primary member, and at least one cable aperture disposed in the primary member and configured to receive a portion of the at least one cable; wherein
the first end of the at least one cable is configured for attachment to the exhaust duct, and the second end of the at least one cable is configured for engagement with the cable flange; and
a liner flange having
at least one outwardly extending second tab,
at least one leg configured for attachment to the exhaust liner,
a projection element having a distal end, and
a leg of the at least one leg having a distal end, the leg extending outwardly from the projection element in a direction substantially perpendicular to the projection element and the at least one outwardly extending second tab extending outwardly from the projection member, wherein
the liner flange and cable flange are configured to mate with one another such that the plurality of first tabs prevent substantial relative motion between the cable flange and the liner flange in a first direction, and the second tab prevents substantial relative motion between the cable flange and the liner flange in a second direction, wherein the first and second directions are orthogonal to one another.

15. The hanger of claim 14, wherein the cable flange includes a first surface and a second surface, which second surface is opposite the first surface, and wherein the at least one cable aperture extends between the first surface of the cable flange and the second surface of the cable flange.

16. The hanger of claim 14, wherein the cable flange includes a wing element that extends outwardly from the primary member, the wing element having a distal end spaced apart from the primary member, and a wing tab extending outwardly from the wing element adjacent the distal end of the wing element.

17. The hanger of claim 16, wherein the plurality of first tabs and the wing tab extend in similar directions.

18. The hanger of claim 17, wherein the plurality of first tabs and the wing tab extend in a direction substantially perpendicular to the first and second directions.

19. The hanger of claim 17, wherein the plurality of first tabs include a first primary tab and a second primary tab, and wherein the at least one cable aperture extends through the cable flange at a position disposed between the first primary tab and the second primary tab.

20. The hanger of claim 14, wherein the cable includes a boss adjacent the second end of the at least one cable; and the cable flange includes a first surface and a second surface, which second surface is opposite the first surface, and the cable flange includes a cavity disposed in the second surface, the cavity configured to mate with the boss of the at least one cable; and wherein the at least one cable aperture extends between the first surface of the cable flange and the cavity.

* * * * *